United States Patent Office 3,110,739
Patented Nov. 12, 1963

3,110,739
REACTION OF A THIOPHENE-1,1-DIOXIDE WITH CONJUGATED DIENES AND RESULTING 1,3-CYCLOHEXADIENE DERIVATIVES
Russell M. Bimber, Painesville, Ohio, assignor to Diamond Alkali Company, Cleveland, Ohio, a corporation of Delaware
No Drawing. Filed Feb. 11, 1960, Ser. No. 7,972
9 Claims. (Cl. 260—648)

This invention relates to a novel class of chemical compounds and to a method for preparing such compounds.

More specifically, the present invention relates to a novel class of chemical compounds characterized by the following generic formula:

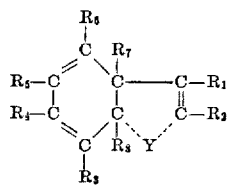

wherein Y is selected from the group consisting of the bivalent radicals, methylene and ethylene, and two monovalent radicals $R_9$ and $R_{10}$, which monovalent radicals are joined to the carbon atoms bearing the $R_3$ and $R_2$ groups but are not joined to each other, and $R_1$ through $R_{10}$ are selected from the group consisting of hydrogen atoms, halogen atoms, aryl, alkyl, aralkyl, and substituted aryl radicals.

Exemplary of the specific compounds falling within the above generic formula are the following:

(I)

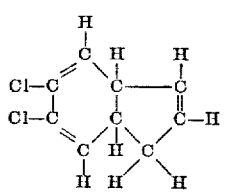

5,6-dichloro-3a,7a-dihydroindene (II)

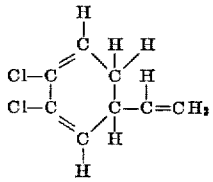

2,3-dichloro-5-vinyl-1,3-cyclohexadiene (III)

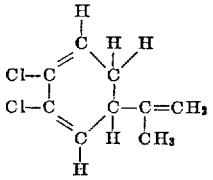

2,3-dichloro-5-isopropenyl-1,3-cyclohexadiene (IV)

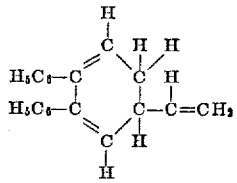

2,3-diphenyl-5-vinyl-1,3-cyclohexadiene (V)

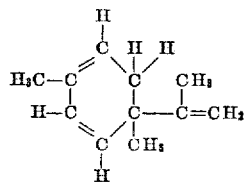

2,5-dimethyl-5-isopropenyl-1,3-cyclohexadiene (VI)

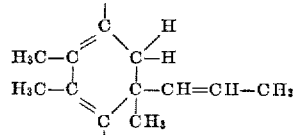

2,3,5-trimethyl-5-(1-propenyl)-1,3-cyclohexadiene (VII)

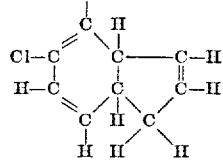

5-chloro-3a,7a-dihydroindene

In general, the compounds of the present invention are prepared by reacting a thiophene 1,1-dioxide with a conjugated diene in a Diels-Alder reaction. In this reaction, the conjugated diene acts as the dienophile, while the thiophene 1,1-dioxide acts as the diene. The preferred thiophene 1,1-dioxides are those which are symmetrically substituted, such as 3,4-dichlorothiophene 1,1-dioxide; 3,4-dimethylthiophene 1,1-dioxide and 3,4-diphenylthiophene 1,1-dioxide, but others may also be employed. The conjugated diene may be either a non-cyclic hydrocarbon or a cyclic hydrocarbon containing 5 or 6 carbon atoms in the ring. Exemplary of the conjugated dienes which may be reacted with the thiophene 1,1-dioxides are the following: 1,3-pentadiene; 1,3-hexadiene; butadiene; isoprene, cyclopentadiene; 1,3-cyclohexadiene; 2,3-dimethylbutadiene; 2,3-diphenylbutadiene and the like.

The Diels-Alder reaction between the thiophene 1,1-dioxide and the conjugated diene is effected by combining these reactants in a suitable solvent, such as methanol, chloroform, or acetone and, when necessary, heating the solution. Two separate and distinct Diels-Alder type products are generally formed, wherein the roles of the reagents as diene and dienophile are reversed. The products which result from reaction of the thiophene 1,1-dioxide are the subject of our copending U.S. applications, Serial No. 7,981, filed in the name of Henry Bluestone on February 11, 1960, Serial No. 7,982, filed in the name of Henry Bluestone on February 11, 1960, Serial No. 7,983, filed in the names of Russell Bimber and Henry Bluestone on February 11, 1960, and Serial No. 7,984, filed in the names of Russell Bimber, Henry Bluestone and Irving Rosen on February 11, 1960. The two products are separated by conventional methods, such as crystallization, distillation and the like.

It is to be understood that where the term "halogen" is used in the present description of the invention and the claims, it is intended to refer to fluorine, chlorine, bromine and iodine. However, because of its low cost and ready availability, the preferred halogen is chlorine and for this reason, hereinafter, particular reference will be made thereto.

In order that those skilled in the art may better understand the method of the present invention and the manner in which it may be practiced, the following specific examples are given. In these examples, the compound 3,4-dichlorothiophene 1,1-dioxide is prepared according to the method set forth in U.S. application Serial No. 709,449, filed January 17, 1958, in the name of Henry Bluestone now U.S. Patent No. 2,976,297. Additionallly, the 3,3,4,4 - tetrachlorotetrahydrothiophene 1,1 - dioxide referred to in this preparation, is prepared according to the method set forth in U.S. application Serial No. 645,676, now U.S. Patent No. 2,957,887.

EXAMPLE 1

*Preparation of 5,6-Dichloro-3a,7a-Dihydroindene (I)*

A solution of 185 g. (1.0 mole) of 3,4-dichlorothiophene 1,1-dioxide in 850 ml. of acetone is stirred at a temperature below 5° C. while 101.8 g. (1.5 moles) of freshly prepared monomeric cyclopentadiene is added over a period of 25 minutes. Following the addition of the cyclopentadiene, the reaction mixture is allowed to warm to room temperature in a stream of air so as to evaporate the acetone therefrom. The reaction mixture is filtered, and the crystalline material thus recovered is triturated with methanol and then recrystallized from methanol. The liquors from the trituration and recrystallization are combined with the filtrate and the total volume of liquor is concentrated by removing the methanol under reduced pressure. From this concentration of the mother liquor there is obtained 73.3 g. of a brown liquid which, upon distillation, produces 30.4 g. of colorless liquid (I) having a boiling point of 74° to 77° C. at 0.7 mm. This liquid has a refractive index ($N_D^{27}$) of 1.5600 and a density ($D_4^{27}$) of 1.273. The elemental analysis of this material is as follows:

| Element | Calculated, Percent by Weight | Actual, Percent by Weight |
|---|---|---|
| C | 57.8 | 57.8 |
| H | 4.3 | 4.0 |
| S | absent | absent |

EXAMPLE 2

*Preparation of 2,3-Dichloro-5-Vinyl-1,3-Cyclohexadiene (II)*

A solution of 46.3 g. (0.25 mole) of 3,4-dichlorothiophene 1,1-dioxide in 500 ml. of methanol is stirred and heated at a temperature of 50° to 60° C. for 5 hours while 68 g. (1.26 moles) of butadiene are bubbled into the solution. The methanol is then distilled off under reduced pressure. Upon adding 100 ml. of petroleum ether to the resulting liquid, crude crystals are formed which are purified by recrystallization from methanol. The mother liquor from the crude crystals is freed of petroleum ether by heating under reduced pressure. The residue is distilled twice, producing 10.2 g. of a colorless liquid (II) having a boiling point of 72° to 76° C. at 4.2 mm. This material has a refractive index ($N_D^{25}$) of 1.5315 and a density ($D_4^{25}$) of 1.195. The elemental analysis of this material is as follows:

| Element | Calculated, Percent by Weight | Actual, Percent by Weight |
|---|---|---|
| C | 54.9 | 54.0 |
| H | 4.6 | 4.2 |
| S | absent | absent |

Infrared analysis of the product produces a spectrum having an absorption peak at 3.24 microns, indicating a terminal methylene group and which did not contain any evidence of the presence of an aromatic ring.

EXAMPLE 3

*Preparation of 2,3-Dichloro-5-Isopropenyl-1,3-Cyclohexadiene (III)*

A solution of 111 g. (0.6 mole) of 3,4-dichlorothiophene 1,1-dioxide in 1360 ml. of methanol is stirred at a temperature of 45° to 55° C. while 68 g. (1 mole) of isoprene is added. The resulting solution is stirred for 1 hour while maintaining the temperature at 50° C. and a second mole of isoprene is added. The solution is then stirred for an additional 3 hours while maintaining the temperature at 50° C. The solution is allowed to stand overnight at room temperature and is then distilled. A crude liquid which distills from 70° C. at 1.5 mm. to 90° C. at 0.8 mm. and weighs 47 g. is obtained. Redistilling this portion yields 26 g. of pale yellow liquid (III) having a boiling point of 84° to 85° C. at 3.5 mm. This material has a refractive index ($N_D^{27}$) of 1.5302 and a density ($D_4^{27}$) of 1.164. The elemental analysis of this material is as follows:

| Element | Calculated, Percent by Weight | Actual, Percent by Weight |
|---|---|---|
| C | 57.2 | 57.7 |
| H | 5.3 | 5.3 |
| S | absent | absent |

The compounds of the present invention, because of the cyclohexadiene structure each contains, are useful as intermediates in forming more complex compounds. These compounds readily undergo Diels-Alder reactions, halogenation, and free radical addition. Moreover, the subject compounds are found to polymerize upon standing so that they can be utilized as components of copolymers. In this aspect, the compounds of the present invention can be copolymerized with various other polymerizable substances, such as vinyl compounds, acrylates, conjugated dienes, and the like, to produce new and novel plastic materials having a wide range of uses.

It will further be appreciated that the method of forming the novel compounds of the present invention is also useful in that it provides a convenient way of forming compounds having a 1,3-cyclohexadiene structure. Heretofore, it has been very difficult to form such 1,3-cyclohexadienes since when reducing aromatic compounds it has been almost impossible to prevent the reduction from going all of the way to a saturated cyclohexane. Similarly, in prior methods of oxidizing cycloaliphatics, it has been difficult to prevent this reaction from going all the way to an aromatic compound. It is, thus, seen that the method of the present invention provides a new and novel way of producing 1,3-cyclodienes, which compounds are also novel and useful as chemical intermediates and as components in copolymers.

It is to be understood that although the invention has been described with specific reference to particular embodiments thereof, it is not to be so limited, since changes and alterations therein may be made which are within the full intended scope of this invention as defined by the appended claims.

What is claimed is:

1. A method of preparing a compound of the structure:

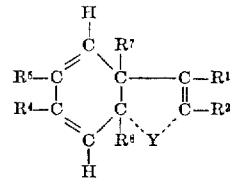

wherein

Y is selected from the group consisting of methylene and monovalent radicals $R^9$ and $R^{10}$, which monovalent radicals are connected to the carbon atoms bearing $R^2$ and $R^8$ groups, but are not connected to each other;

$R^1$ and $R^2$ are selected from the group consisting of hydrogen and lower alkyl;

$R^4$ and $R^5$ are selected from the group consisting of hydrogen, chlorine, lower alkyl and phenyl;

$R^7$ is selected from the group consisting of hydrogen and lower alkyl and $R^8$, $R^9$ and $R^{10}$ are hydrogen;

which method comprises reacting a thiophene-1,1-dioxide selected from the group consisting of 3,4-diphenylthiophene-1,1-dioxide, 3,4-dimethylthiophene-1,1-dioxide and tetraphenylthiophene-1,1-dioxide with a conjugated diene selected from the group consisting of 1,3-pentadiene, 1,3-hexadiene, butadiene, isoprene, cyclopentadiene, 1,3-cyclohexadiene, 2,3-dimethylbutadiene and 2,3-diphenyl butadiene in a Diels-Alder reaction and recovering the thus formed product.

2. A method of preparing 5,6-dichloro-3a,7a-dihydroindene which comprises reacting 3,4-dichlorothiophene 1,1-dioxide and monomeric cyclopentadiene in a Diels-Alder reaction and recovering the thus-formed product.

3. A method of preparing 2,3-dichloro-5-vinyl-1,3-cyclohexadiene which comprises reacting 3,4-dichlorothiophene 1,1-dioxide and butadiene in a Diels-Alder reaction and recovering the thus-formed product.

4. A method of preparing 2,3-dichloro-5-isopropenyl-1,3-cyclohexadiene which comprises reacting 3,4-dichlorothiophene 1,1-dioxide and isoprene in a Diels-Alder reaction and recovering the thus-formed product.

5. A compound selected from the group consisting of 5,6-dichloro-3a,7a-dihydroindene; 2,3-dichloro-5-vinyl-1,3-cyclohexadiene; 2,3-dichloro-5-isopropenyl-1,3-cyclohexadiene and 5-chloro-3a,7a-dihydroindene.

6. 5,6-dichloro-3a,7a-dihydroindene.

7. 2,3-dichloro-5-vinyl-1,3-cyclohexadiene.

8. 2,3-dichloro-5-isopropenyl-1,3-cyclohexadiene.

9. 5-chloro-3a,7a-dihydroindene.

References Cited in the file of this patent
UNITED STATES PATENTS

| | | |
|---|---|---|
| 2,401,099 | Peterson | May 28, 1946 |
| 2,450,627 | Bloch | Oct. 5, 1948 |
| 2,626,961 | Eberly et al. | Jan. 27, 1953 |

FOREIGN PATENTS

| | | |
|---|---|---|
| 570,869 | Great Britain | July 26, 1945 |

OTHER REFERENCES

Kloetzel: "Organic Reactions," volume IV, pages 1–59 (1948), published by John Wiley and Sons, Inc., New York, N.Y.

Holmes: "Organic Reactions," volume IV, pages 60–173 (1948), published by John Wiley and Sons, Inc., New York, N.Y.

Alder et al.: "Berichte," vol. 87 (1954), p. 1916–22.

Petrov et al.: "Doklady akad. Nauk, SSSR," vol. 79 (1950), page 811–3 (Chem. Abstr. 7,064).

Sadykh-Zade et al.: Ibid, vol. 112 (1957), p. 662–5 (51 Chem. Abstr. 13,745).

Normant et al.: "Bull. Chim. Soc. France," 1956, p. 951–5 (51 Chem. Abstr. 1,076–7).

UNITED STATES PATENT OFFICE
CERTIFICATE OF CORRECTION

Patent No. 3,110,739                                          November 12, 1963

Russell M. Bimber

It is hereby certified that error appears in the above numbered patent requiring correction and that the said Letters Patent should read as corrected below.

Column 5, lines 11 and 12, for "3,4-diphenylthiophene-" read -- 3,4-dichlorothiophene- --; line 13, for "tetraphenylthiophene" read -- 3,4-diphenylthiophene --.

Signed and sealed this 28th day of April 1964.

(SEAL)
Attest:
ERNEST W. SWIDER

Attesting Officer

EDWARD J. BRENNER
                                                                                          Commissioner of Patents